US012613434B2

(12) United States Patent
Bloechlinger et al.

(10) Patent No.: US 12,613,434 B2
(45) Date of Patent: Apr. 28, 2026

(54) GOGGLES DEVICE, GOGGLES, METHOD FOR OPERATION

(71) Applicant: Optrel Holding AG, Wattwil (CH)

(72) Inventors: Daniel Bloechlinger, Gallenkappel (CH); Marco Koch, Muehlrueti (CH)

(73) Assignee: Optrel Holding AG, Wattwil (CH)

( * ) Notice: Subject to any disclaimer, the term of this patent is extended or adjusted under 35 U.S.C. 154(b) by 288 days.

(21) Appl. No.: 18/374,549

(22) Filed: Sep. 28, 2023

(65) Prior Publication Data

US 2024/0111180 A1 Apr. 4, 2024

(30) Foreign Application Priority Data

Sep. 29, 2022 (EP) .................................... 22198829

(51) Int. Cl.
*G02C 7/10* (2006.01)
*G02C 5/00* (2006.01)
*G02C 11/00* (2006.01)

(52) U.S. Cl.
CPC ............. *G02C 7/101* (2013.01); *G02C 5/001* (2013.01); *G02C 11/10* (2013.01)

(58) Field of Classification Search
CPC ........ G02C 7/101; G02C 5/001; G02C 11/10; G02F 1/13318; G02F 2201/58; A61F 9/023
See application file for complete search history.

(56) References Cited

U.S. PATENT DOCUMENTS 6,433,913 B1 8/2002 Bauer et al.
2011/0283431 A1 11/2011 Miller et al.

OTHER PUBLICATIONS

European Search Report for European Patent Application No. 22198829.8, dated Mar. 15, 2023, 15 pages.
Office Action received in related European Application No. 22198829.8, mailed Oct. 15, 2025, 10 pages.

*Primary Examiner* — Tuyen Tra

(74) *Attorney, Agent, or Firm* — Womble Bond Dickinson (US) LLP

(57) ABSTRACT

A glasses device, in particular ski goggles, sunglasses, motorcycle goggles, or the like, has a see-through unit, which includes at least one darkening element, in particular a liquid crystal cell, which is configured for darkening at least one subregion of the see-through unit, and has a light sensor unit, which is configured to generate a sensor signal dependent on an ambient brightness, which is the basis for a degree, in particular set automatically, of an, in particular variable, darkening of the darkening element, wherein the glasses device has a switch-off unit, which provides at least one, in particular manually operable, switch-off function for the sensor signal of the light sensor unit.

12 Claims, 3 Drawing Sheets

GOGGLES DEVICE, GOGGLES, METHOD FOR OPERATION

CROSS-REFERENCE TO OTHER APPLICATION

Figure 1:
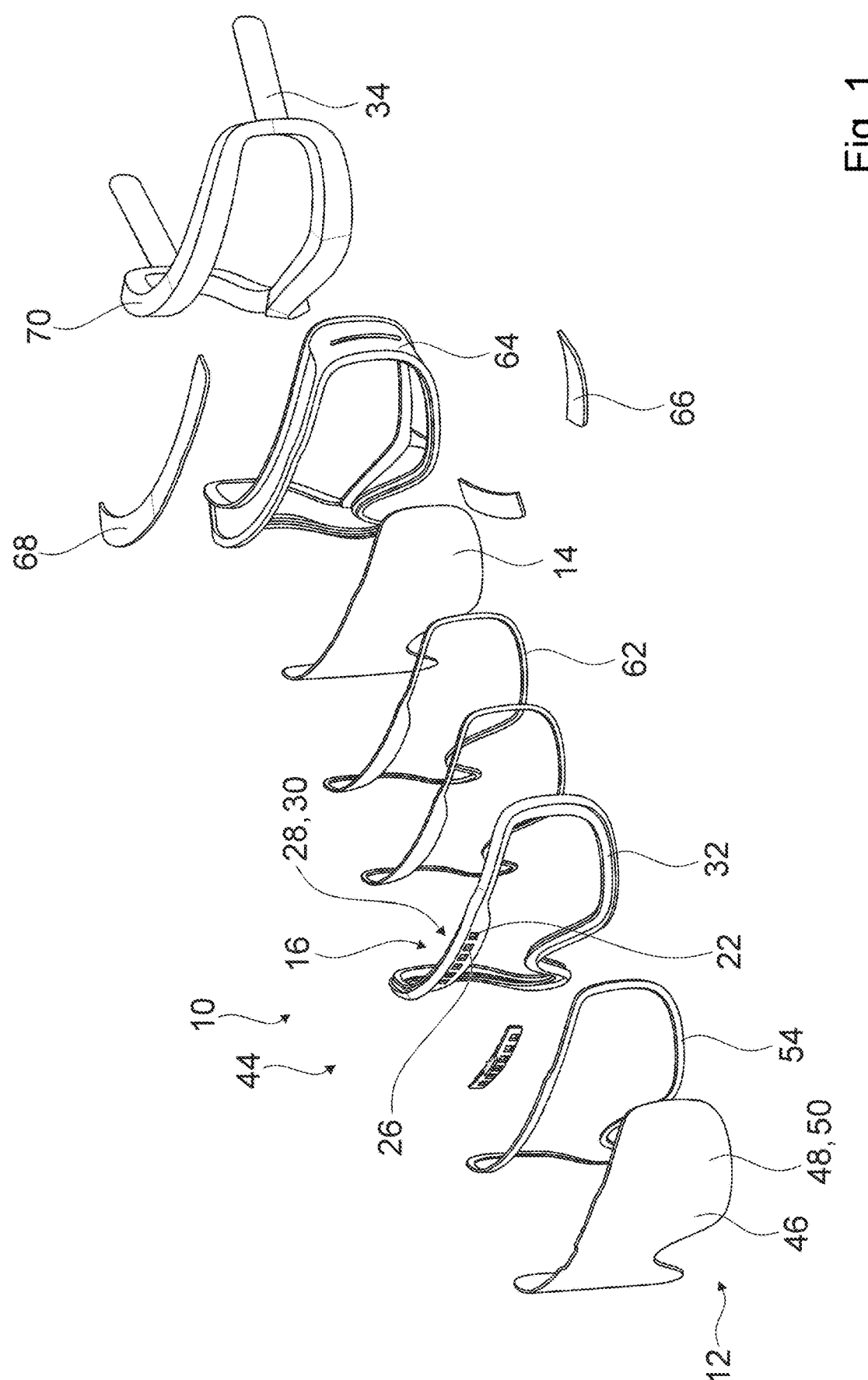

This patent application is based on and incorporates herein by reference the European patent application EP 22198829.8, filed on Sep. 29, 2022.

PRIOR ART

The invention relates to a glasses device, glasses, and a method.

A glasses device having a see-through unit, which includes at least one darkening element configured for darkening at least one subregion of the see-through unit, and having a light sensor unit, which is configured to generate a sensor signal dependent on an ambient brightness, which is the basis for a degree of a darkening of the darkening element, has already been proposed.

The object of the invention is in particular to provide a device of the type in question having improved properties with respect to a function. The object is achieved according to the invention.

Advantages of the Invention

The invention has for its starting point a glasses device, in particular ski goggles, sunglasses, motorcycle goggles, or the like, having a see-through unit, which includes at least one darkening element, in particular a liquid crystal cell, which is configured for darkening at least one subregion of the see-through unit, and having a light sensor unit, which is configured to generate a sensor signal dependent on an ambient brightness, which is the basis for a degree, in particular set automatically, of an, in particular variable, darkening of the darkening element.

It is proposed that the glasses device include a switch-off unit, which provides at least one, in particular manually operable, switch-off function for the sensor signal of the light sensor unit. Comfort can advantageously be improved by the design according to the invention of the glasses device, since in particular the degree of darkening by the darkening element is settable individually for each user. A level of safety can advantageously be increased, since in particular if needed by the user the darkening can be switched off in any operating situation, for example, ambient conditions having fog or rain, and thus good vision can be ensured at all times.

The glasses device is preferably designed as ski goggles, sunglasses, motorcycle goggles, or comparable glasses, in particular leisure glasses. The glasses device can be part of a pair of glasses and/or a helmet and/or a screen and/or a mask and/or in a comparable application which protects a user from brightness, in particular UV radiation. The see-through unit is preferably designed as a lens and/or a glasses lens and/or as a visor. The see-through unit is preferably at least made of a plastic, which is in particular fracture resistant, and/or a composite glass and/or of a commercially available glass material or of a comparable transparent material. The see-through unit is preferably formed from multiple lenses, which are in particular equal in size and arranged congruently. All lenses forming a see-through unit are preferably fixedly connected to one another, in particular in a formfitting and/or materially bonded manner. The see-through unit is preferably transparent and/or partially transparent. The transparent and/or partially transparent see-through unit is preferably coloured, coated and/or vapour deposited and/or tinted. In particular, the see-through unit can include a photochromatic layer. The photochromatic layer is configured to change a spectral transmission in the visible range under the effect of electromagnetic radiation, in particular UV radiation, reversibly, in particular as long as the photochromatic layer is subjected to the electromagnetic radiation. The see-through unit preferably includes at least one coloured and transparent element, in particular see-through element. The tinting, which is in particular coloured, of the see-through unit is preferably configured to keep UV beams away from the human eye of the user and/or to prevent blinding due to locally occurring bundled solar radiation. The see-through unit preferably includes at least one darkening element. The darkening element is preferably designed as a liquid crystal cell, in particular an LCD lens (liquid crystal display). The liquid crystal cell preferably has a voltage-dependent light transmission and in particular is continuous and/or variable. The light transmission of the liquid crystal cell is preferably controllable via a voltage. The darkening element is preferably configured to reduce a brightness, in particular an ambient brightness, for the human eye of a user and to protect the human eye and/or the human skin of the user from UV radiation. In particular, the darkening element is configured to vary a transparency of the see-through unit, in particular to increase or reduce it. The see-through unit and/or the darkening element preferably has a curved profile, in particular concavely curved, from an observation direction of the user wearing the glasses.

An "ambient brightness" is to be understood here in particular as a brightness of the surroundings, in particular a brightness outside a glasses space which delimits the field of view of a human eye through the glasses having the glasses device.

The light sensor unit is preferably designed as a photodiode or a solar cell, in particular a photovoltaic cell, or as a comparable electrical semiconductor component, which converts sunlight, in particular visible electromagnetic radiation, into electrical energy, in particular an electrical voltage. The light sensor unit is preferably integrated in the glasses, in particular a frame and/or an earpiece of the glasses, or arranged on the glasses. The light sensor unit preferably includes at least one sensor field for detecting the ambient brightness. The sensor field could include a coating, such as a photochromatic layer. In particular, the photochromatic layer is configured to reduce a brightness incident on the sensor field, wherein the photochromatic layer influences the degree of the darkening by the darkening element. The light sensor unit preferably includes a circuit board as a carrier element. The light sensor unit preferably includes a control and regulating unit, which is configured to process a sensor signal generated by the sensor field, in particular an electrical voltage signal. A "control and/or regulating unit" is to be understood in particular as a unit having at least one control electronics unit. A "control electronics unit" is to be understood in particular as a unit having a processor and having a memory and also having an operating program stored in the memory. The sensor signal is preferably designed as an electrical voltage. The sensor signal is preferably dependent on the brightness, in particular at least essentially linearly, in particular a light intensity of the electromagnetic radiation. The sensor signal is preferably configured to set, in particular to control, the degree of darkening of the darkening element. The sensor signal is preferably used as an electrical energy source for the darkening by the darkening element and/or for an electrical supply of the glasses device, in particular an electrical supply of an energy storage device which supplies the glasses device with electrical energy.

The switch-off unit is preferably configured to completely switch off and/or prevent darkening (possibly in addition to a tint) generated by the darkening element. The switch-off unit preferably includes a switch-off function, which disconnects the sensor signal, in particular the electrical voltage from the control unit and/or the electrical supply line from the darkening unit. The switch-off function of the switch-off unit is preferably configured to at least essentially eliminate an ambient brightness and/or to suppress a voltage signal, in particular the generation of the electrical voltage, of the sensor unit. The switch-off function of the switch-off unit is preferably manually operable, in particular by the user of the glasses device or by a third party.

"Configured" is to be understood in particular as specially programmed, designed, and/or equipped. An object being configured for a specific function is to be understood in particular to mean that the object fulfils and/or executes this specific function in at least one application and/or operation state.

Furthermore, it is proposed that the switch-off unit include a mechanical cover element, which is configured in at least one operation state to at least essentially completely cover at least all measurement regions of the light sensor unit. The switch-off unit can advantageously be actuated particularly easily, since in particular the switch-off unit can also be actuated easily using gloves or using an arm. The mechanical cover element is preferably arranged on a frame and/or earpiece of the glasses. The mechanical cover element is preferably movable/mounted movably along the frame and/or the earpiece of the glasses. The mechanical cover element is preferably designed as a slide or bar or flap, which is in particular displaceable and/or settable. It is also conceivable that the mechanical cover element is designed so it can be rotationally opened or closed. The mechanical cover element is preferably opaque, in particular light-opaque. The mechanical cover element is preferably configured to shield electromagnetic radiation, in particular having a wavelength range of visible light, from the measurement regions of the light sensor unit. The cover element preferably shields a subregion of the light sensor unit against electromagnetic radiation which is not covered by further parts of the glasses, in particular the frame and/or earpiece of the glasses fastening the light sensor unit. The mechanical cover element and/or the frame and/or the earpiece of the glasses is preferably formed from a plastic, which is in particular manufactured by production in a single-component or multicomponent injection moulding method. An "essentially complete" covering is to be understood in particular as a covering of more than 90%, preferably of more than 95%, and preferably of more than 99%. The mechanical cover element particularly preferably completely (100%) covers the measurement regions in the operation state.

Furthermore, it is proposed that the mechanical cover element be configured in at least one further operation state to only partially cover the measurement regions of the light sensor unit. A comfort for the user of the glasses having the glasses device can advantageously be improved, since in particular the brightness can be adjusted by the darkening element, in particular the lens, individually to the requirements of the user. A movement of the mechanical cover element, in particular to cover the measurement region of the light sensor unit, is preferably continuous. Any arbitrary position of the mechanical cover element is preferably fastened and/or fixed in a friction-locked manner with the frame and/or the earpiece of the glasses.

In addition, it is proposed that the mechanical cover element include at least one pass-through opening, preferably completely bordered in a circumferential direction by the cover element, which is configured in at least one (additional) further operation state to completely overlap with at least one measurement region of the light sensor unit. The measurement region of the light sensor unit can advantageously be completely subjected to the ambient brightness, by which in particular a maximum darkening of the darkening element can be achieved at given ambient brightness. The pass-through opening is preferably larger than and/or at least essentially as large as the measurement region of the light sensor unit. The pass-through opening is preferably rectangular, in particular square. It is also conceivable that the pass-through opening is polygonal or round. In particular, the pass-through opening of the mechanical cover element is larger than or at least equal in size to the corresponding measurement region of the light sensor unit.

In addition, it is proposed that the pass-through opening of the mechanical cover element, in the operation state in which in particular all measurement regions of the light sensor unit are at least essentially completely covered, be free of overlap with the measurement region, and in particular with all further measurement regions of the light sensor unit. A level of safety of the user can advantageously be increased, since in particular the darkening can be switched off mechanically, in particular also in an operation state without electrical energy, for example, with completely discharged accumulator, as needed by the user in any operating situation, for example, ambient conditions having fog or rain, and good vision can thus be ensured at any time. The mechanical cover element preferably includes at least one opaque and/or partially opaque subregion, which is larger than the measurement region of the light sensor unit. The mechanical cover element, in particular in the operation state having pass-through openings which are arranged without overlap with the measurement regions, is preferably configured to shield the ambient brightness, in particular completely, from the measurement region and/or to suppress generation of the voltage signal by the light sensor unit.

Furthermore, it is proposed that the light sensor unit include at least one solar cell and/or at least one photodiode. An operating comfort can advantageously be improved, since in particular a degree of the darkness can be set automatically by the photodiode depending on the ambient brightness. A maintenance interval can advantageously be extended or a maintenance interval can be completely omitted, since in particular a voltage supply is ensured by the solar cell at all times and therefore an external voltage supply, which is maintenance intensive in particular, such as an accumulator, can therefore be omitted. The photodiode is preferably configured to detect a brightness, in particular with high sensitivity. A solar cell is preferably configured to generate electric current, in particular for an electrical supply of the glasses device.

It is additionally proposed that the mechanical cover element be arranged, in particular integrated or mounted, on the frame and/or on a glasses earpiece. A comfort can advantageously be improved, since in particular the mechanical cover element is arranged at a position well accessible for the user. The mechanical cover element can advantageously be retrofitted, since in particular a later fastening of the cover element and/or a later installation of the light sensor unit and/or the darkening element is possible. The mechanical cover element is preferably arranged in a formfitting manner on the frame and/or the earpiece of the glasses. The mechanical cover element is preferably arranged above the darkening element. The mechanical cover element is preferably arranged outside a field of view of the user. The mechanical cover element is preferably mounted movably along a longitudinal extension of the darkening element, in particular rotationally movable at least in sections around a rotation centre point of the curved profile, in particular concavely curved, of the see-through unit, and/or of the darkening element.

Furthermore, it is proposed that the switch-off unit, in particular alternatively or additionally to the manually movable mechanical cover element, be operable by means of a remote control, in particular a mobile device, such as a smart phone. A manual control can advantageously be automated, since in particular a remote control via a smart phone also enables a control dependent on time of day and/or location. The switch-off unit can advantageously also be operated by a third party, since in particular operation from a greater distance is possible. The remote control is preferably comprised by the switch-off unit in addition to the mechanical cover element. The remote control is preferably configured for turning on and off and/or regulating the degree of darkness of the see-through unit.

In addition, glasses having the glasses device are proposed. An operating comfort is advantageously improved, since in particular the glasses having the glasses device automatically adjusts the degree of darkness of the see-through unit when the ambient brightness changes.

Furthermore, a method for operating the glasses device is proposed, wherein in at least one switch-off step, the sensor signal is switched off via a switch-off unit, which is in particular manually operable. The user can advantageously decide themselves whether the see-through unit is to be darkened by the darkening element.

It is additionally proposed that in the switch-off step, the sensor signal be switched off by mechanically covering a light sensor unit which generates the sensor signal. The user can advantageously decide themselves whether and/or how strongly the see-through unit is to be darkened by the darkening element. The glasses are advantageously individually adjusted to the needs of the operator, since in particular a degree of the darkness can be determined by the continuous adjustment of the mechanical switch-off element.

DRAWINGS

Further advantages result from the following description of the drawings. An exemplary embodiment of the invention is shown in the drawings. The drawings, the description, and the claims contain numerous features in combination. A person skilled in the art will also expediently consider the features individually and combine them to form reasonable further combinations.

Figure 2:
Figure 3A:
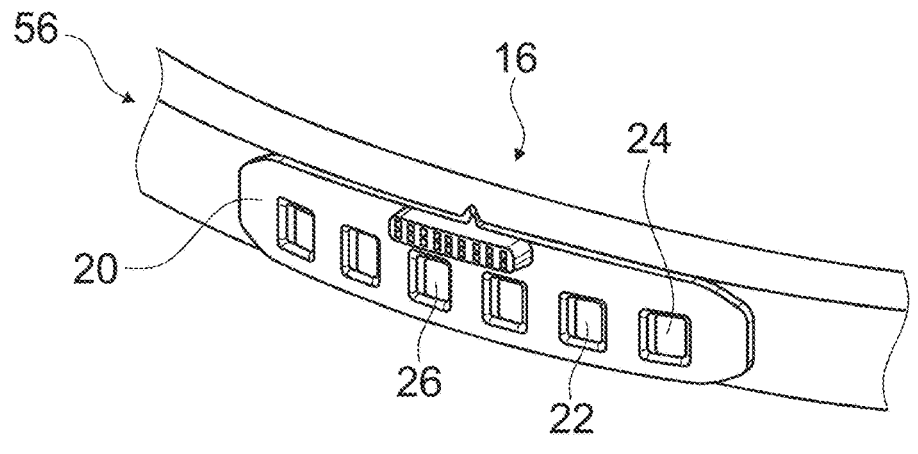
Figure 3B:
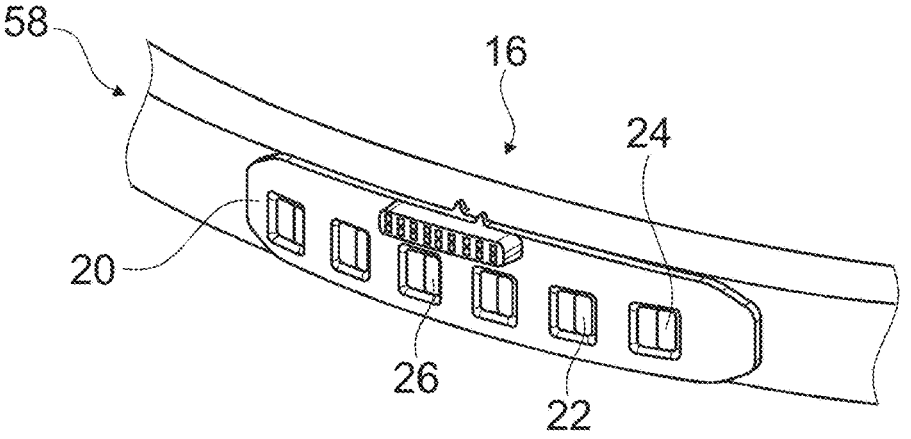
Figure 3C:
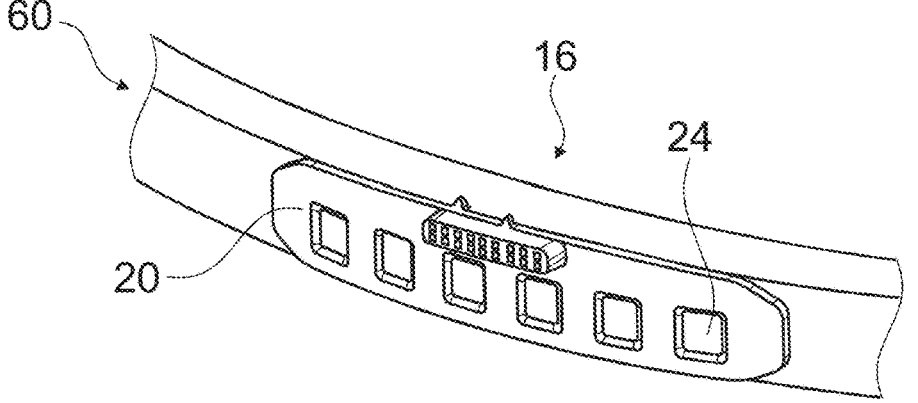
Figure 4:
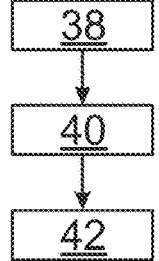

In the figures:

FIG. 1 shows a schematic exploded view of glasses having a glasses device,

FIG. 2 shows a partially reassembled schematic exploded view of the glasses having the glasses device, FIG. 3a shows a schematic view of a detail of the glasses having the glasses device having a mechanical cover element in an operation state, FIG. 3b shows a schematic view of the detail of the glasses having the glasses device having the mechanical cover element in a further operation state, FIG. 3c shows a schematic view of the detail of the glasses having the glasses device having the mechanical cover element in an additional further operation state, and FIG. 4 shows a schematic flow chart of a method for operating the glasses device.

DESCRIPTION OF THE EXEMPLARY EMBODIMENTS

FIG. 1 shows a pair of glasses 44. The glasses 44 include a glasses device 10. The glasses device 10 is designed as ski goggles. The glasses device 10 could also be designed as sunglasses or motorcycle goggles or comparable glasses as comfort glasses for a leisure use or work protection glasses for a commercial application. The glasses device 10 includes a see-through unit 12. The see-through unit 12 is designed as a lens 48. The lens 48 of the see-through unit 12 is made of a plastic. Alternatively, the lens 48 could be made of a composite glass or a glass material. The lens 48 is transparent. Alternatively, the lens 48 could also be partially transparent. Alternatively, the lens 48 could be transparent in some sections. The lens 48 of the see-through unit 12 is tinted. Alternatively, the lens 48 of the see-through unit 12 could be coloured and/or coated and/or vapour deposited. The lens 48 includes a subregion 46. The subregion 46 extends over the entire transparent region of the see-through unit 12. Alternatively, the subregion 46 could extend only partially over the transparent region of the see-through unit 12. The see-through unit 12 includes a darkening element 14. The darkening element 14 is designed as a liquid crystal cell. The darkening element 14 is configured for darkening the subregion 46 of the see-through unit 12. The darkening element 14 is electrically activatable. The darkening element 14 is designed so it can be darkened continuously. The see-through unit 12 could include further lenses 50. The further lens 50 could be designed as an anti-fog lens and/or an anti-scratch lens and/or a head-up display lens and/or a prescription lens or a comparable lens. The lens 48 and the darkening element 14 of the see-through unit 12 and any further lens 50 are equal in size. The lens 48 and the darkening element 14 are arranged congruently in relation to one another. The lens 48 and the darkening element 14 are materially bonded to one another. The lens 48 and the darkening element 14 could alternatively also be connected to one another in a formfitting manner. Each further lens 50 is connected in a materially bonded and/or formfitting manner to the see-through unit 12 and/or the lens 48 and/or the darkening element 14.

The glasses device 10 includes a frame 32. The frame 32 encloses the see-through unit 12. The frame 32 fastens the see-through unit 12. The frame 32 completely surrounds the see-through unit 12. Alternatively, the frame 32 could only partially surround the see-through unit 12. The glasses device 10 includes an adhesive element 54 and a further adhesive element 62. The adhesive element 54 and/or the further adhesive element 62 is configured to fix the see-through unit 12 on the frame 32. The frame 32 is produced from a plastic. The frame 32 delimits a field of view of a user. The glasses device 10 includes a glasses earpiece 34. The glasses earpiece 34 is fixed on the frame 32. Alternatively, the glasses earpiece 34 could be integrally formed with the frame 32. Alternatively, the glasses earpiece 34 could also be designed as a glasses strap. Alternatively, the glasses device 10 could be arranged on a helmet or a visor or comparable device which assumes the function of the glasses earpiece 34. The glasses device 10 includes a further frame 64. The further frame 64 is made of a soft and/or air-permeable material, such as a flexible plastic or a foam. The further frame 64 includes ventilation openings. The further frame 64 is configured to enable ventilation and thus prevent fogging up of the see-through unit 12. The glasses device 10 includes a cover element 66 and/or a further cover element 68. The cover element 66 and the further cover element 68 are made of an air-permeable material, such as a foam. The cover element 66 is configured to enable ventilation in a lower ventilation region. The further cover element 68 is configured to enable ventilation in an upper ventilation region. The cover element 66 and/or the further cover element 68 could be formed in multiple parts. The glasses device 10 includes a sealing element 70. The sealing element 70 is made of a soft, reversibly deformable material, such as a foam. The sealing element 70 is configured to connect the glasses device 10 in a fluid-tight manner to a face of the user.

The glasses device 10 includes a light sensor unit 16. The light sensor unit 16 is arranged above the see-through unit 12. Alternatively, the light sensor unit 16 could also be arranged laterally to and/or below the see-through unit 12. The light sensor unit 16 is arranged outside the field of view of the user. The light sensor unit 16 is arranged on the frame 32. Alternatively, the light sensor unit 16 could be arranged on the glasses earpiece 34 and/or on a glasses strap and/or on the helmet and/or on a visor. The light sensor unit 16 is integrated in the frame 32 of the glasses device 10 and/or in the glasses earpiece 34 of the glasses device 10. It is conceivable that the light sensor unit 16 is mounted on the frame 32 of the glasses device 10 and/or on the glasses earpiece 34 of the glasses device 10.

The light sensor unit 16 includes a solar cell 28 and a photodiode 30. The light sensor unit 16 could also include only a solar cell 28 or only a photodiode 30. The light sensor unit 16 could include multiple solar cells 28. The light sensor unit 16 could include multiple photodiodes 30. The light sensor unit 16 forms six measurement regions 22, 26. The light sensor unit 16 could also include a number of measurement regions 22 different from six. The light sensor unit 16 is configured to convert light incident on the measurement regions 22, 26 into an electrical voltage. The electrical voltage is proportional to the light intensity. The light sensor unit 16 is configured to generate a sensor signal dependent on an ambient brightness. The sensor signal is formed as an electrical voltage. The sensor signal is the basis of an automatically set degree of a variable darkening of the darkening element 14.

FIG. 2 shows the glasses device 10. The glasses device 10 includes a switch-off unit 18. The switch-off unit 18 provides a manually operable switch-off function for the sensor signal of the light sensor unit 16. The switch-off unit 18 includes a mechanical cover element 20. The mechanical cover element 20 is configured in an operation state 60 (cf. FIG. 3c) to completely cover all measurement regions 22, 26 of the light sensor unit 16. The mechanical cover element 20 is configured in a further operation state 58 (cf. FIG. 3b) to partially cover the measurement regions 22, 26 of the light sensor unit 16. The mechanical cover element 20 is continuously adjustable. The continuously adjustable mechanical cover element 20 enables a continuous regulation of the darkening element 14. The mechanical cover element 20 is designed as a slide. The mechanical cover element 20 is movable in sections along a longitudinal extension of the see-through unit 12. The mechanical cover element 20 is mounted so it is rotationally movable in sections around a rotation centre point of a concavely curved profile of the see-through unit 12. Alternatively, the slide could also cover the measurement regions 22, 26 by way of a rotational movement or a flap movement or a comparable movement. The switch-off unit 18 is alternatively or additionally operable by means of a remote control 36. The remote control 36 is designed as a mobile device. The mobile device could be a smart phone or a tablet or a comparable mobile device.

The mechanical cover element 20 is arranged on the frame 32 and/or on the glasses earpiece 34. The mechanical cover element 20 is integrated in the frame 32 and/or in the glasses earpiece 34. It is conceivable that the mechanical cover element 20 is mounted on the frame 32 and on the glasses earpiece 34. The mechanical cover element 20 is connected in a formfitting manner to the frame 32 of the glasses device 10 and/or the glasses earpiece 34.

FIGS. 3a to 3c show the mechanical cover element 20. The mechanical cover element 20 is made of an opaque plastic. The mechanical cover element 20 includes six pass-through openings 24. The mechanical cover element 20 could include a number of pass-through openings 24 deviating from six. The mechanical cover element 20 includes an equal number of pass-through openings 24 as the light sensor unit 16 comprises measurement regions 22, 26. The pass-through openings 24 are rectangular. Alternatively, the pass-through openings 24 could also be round or triangular or in another shape. The pass-through openings 24 are completely bordered in a circumferential direction by the mechanical cover element 20. The pass-through openings 24 are configured to overlap completely with the measurement regions 22, 26 of the light sensor unit 16 in a further operation state 56 (cf. FIG. 3a). It is conceivable that the pass-through openings 24 are closed fluid-tight using a transparent or partially transparent optical element. The optical element could have a water repellent coating, in order to prevent impairment of the function or damage to the light sensor unit 16 by raindrops. For example, the partially transparent optical element could be exclusively transmissive for specific wavelengths of electromagnetic radiation. For example, the partially transparent optical element could be only transmissive for UV radiation in order to protect the human eye from UV radiation.

FIG. 3a shows the operation state 56. The pass-through openings 24 of the mechanical cover element 20 are arranged completely overlapping with the measurement regions 22, 26 in the operation state 56. The operation state 56 with pass-through openings 24 completely overlapping with the measurement regions 22, 26 is configured to achieve an automatically set degree of the variable darkening of the darkening element 14 having a maximum darkening.

FIG. 3b shows the operation state 58. The pass-through openings 24 of the mechanical cover element 20 are arranged partially overlapping with the measurement regions 22, 26 in the operation state 58. The operation state 58 with pass-through openings 24 partially overlapping with the measurement regions 22, 26 is configured to achieve an automatically set degree of the variable darkening of the darkening element 14 having a user-dependent darkening.

FIG. 3c shows the operation state 60. The pass-through openings 24 of the mechanical cover element 20 are arranged without overlap with all measurement regions 22, 26 of the light sensor unit 16 in the operation state 60. The operation state 60 with pass-through openings 24 arranged without overlap with the measurement regions 22, 26 is configured to completely switch off automatic darkening of the darkening element 14.

FIG. 4 shows a schematic flow chart of a method for operating a glasses device 10.

In a method step 38, the pass-through openings 24 of the mechanical cover element 20 are aligned completely overlapping with the measurement regions 22, 26. The ambient brightness acquired by the measurement regions 22, 26 is converted by the solar cell 28 and/or the photodiode 30 into the electrical voltage signal. The darkening element 14 is darkened by the electrical voltage signal depending on the ambient brightness. The see-through unit 12 is darkened in a partially automated and variable manner.

In a method step 40, the see-through unit 12 is partially darkened. For the partial darkening of the see-through unit 12, the mechanical cover element 20 is partially pushed over the measurement regions 22, 26. Due to the partial coverage of the measurement regions 22, 26 by the mechanical cover element 20, a base brightness of the see-through unit 12 is preset by the operator. The see-through unit 12 is darkened in a partially automated and variable manner. The darkening is based on a sensor signal dependent on an ambient brightness. The darkening element 14 is darkened for the darkening of the see-through unit 12. The sensor signal is used as the basis for a degree of the darkening.

In a switch-off step 42, the sensor signal is switched off via an operable switch-off unit 18. The darkening of the see-through unit 12 is switched off by the switching off of the sensor signal. The sensor signal is switched off by mechanically covering a light sensor unit 16 generating the sensor signal. The sensor signal is covered by the mechanical cover element 20 in the switch-off step 42. The mechanical cover element 20 is pushed over the measurement regions 22, 26 of the light sensor unit 16 for the mechanical coverage. Alternatively, the sensor signal can be switched off via the switch-off unit 18 using a mobile device.

LIST OF REFERENCE NUMERALS 10 glasses device
12 see-through unit
14 darkening element
16 light sensor unit
18 switch-off unit
20 cover element
22 measurement region
24 pass-through opening
26 (further) measurement region
28 solar cell
30 photodiode
32 frame
34 glasses earpiece
36 remote control
38 method step
40 method step
42 switch-off step
44 glasses
46 subregion
48 lens
50 lens
54 adhesive element
56 operation state
58 operation state

10

60 operation state
62 adhesive element
64 frame
66 cover element
68 cover element
70 sealing element

The invention claimed is:

1. A glasses device, having a see-through unit which includes at least one darkening element, which is configured for darkening at least one subregion of the see-through unit, and having a light sensor unit, which is configured to generate a sensor signal dependent on an ambient brightness, which is the basis for a degree of a darkening of the darkening element, comprising a switch-off unit, which provides at least one switch-off function for the sensor signal of the light sensor unit, wherein the switch off unit includes a mechanical cover element, which is configured in at least one operation state to at least essentially completely cover at least all measurement regions of the light sensor unit, wherein the mechanical cover element is configured in at least one further operation state to only partially cover the measurement regions of the light sensor unit and wherein the mechanical cover element includes at least one pass-through opening, which is partially or completely bordered in a circumferential direction by the cover element, which in at least one further operation state completely overlaps with at least one measurement region of the light sensor unit, and which in the operation state is free of overlap with the at least one measurement region.

2. The glasses device according to claim 1, wherein the pass-through opening of the mechanical cover element is, in the operation state, free of overlap with all further measurement regions of the light sensor unit.

3. The glasses device according to claim 1, wherein the light sensor unit includes at least one solar cell and/or at least one photodiode.

4. The glasses device according to claim 1, wherein the mechanical cover element is integrated or mounted, on a frame and/or on a glasses earpiece.

5. The glasses device according to claim 1, wherein the switch-off unit is operable by means of a remote control.

6. Glasses having a glasses device according to claim 1.

7. The glasses according to claim 6, being implemented as ski goggles.

8. The glasses according to claim 6, being implemented as sunglasses.

9. The glasses according to claim 6, being implemented as motorcycle goggles.

10. A method for operating a glasses device according to claim 1, wherein in at least one switch-off step, the sensor signal is switched off via the switch-off unit by mechanically covering a light sensor unit which generates the sensor signal.

11. The glasses device according to claim 1, wherein the at least one darkening element is a liquid crystal cell.

12. The glasses device according to claim 1, wherein the switch-off unit is manually operable.

* * * * *